Feb. 23, 1954      T. A. STEHLIN      2,670,173
QUICK-ACTING SHUTOFF VALVE HAVING RENEWABLE VALVE SEAT
Filed July 6, 1948      2 Sheets-Sheet 1
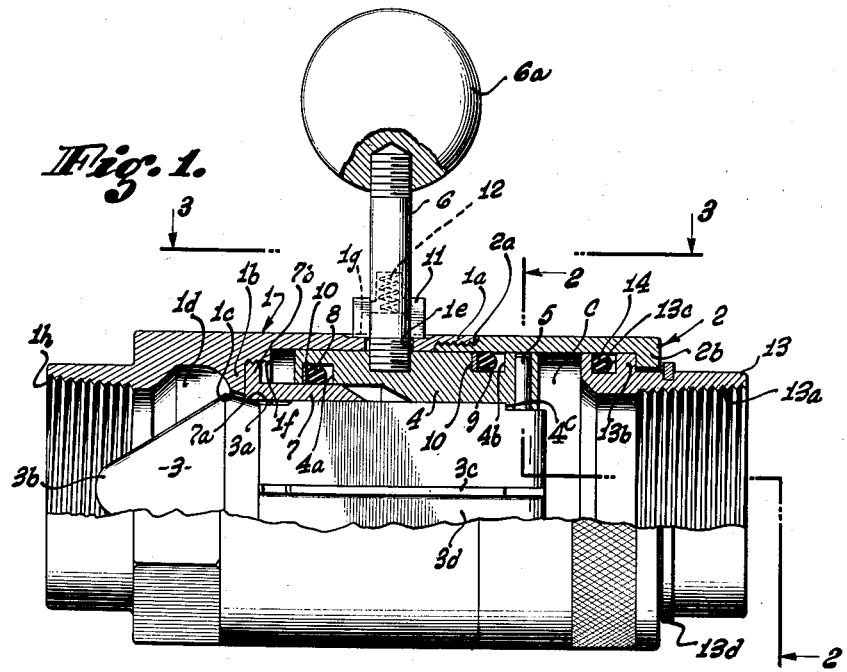
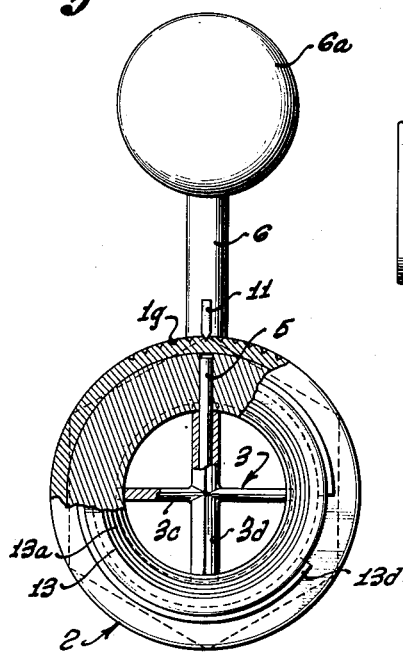
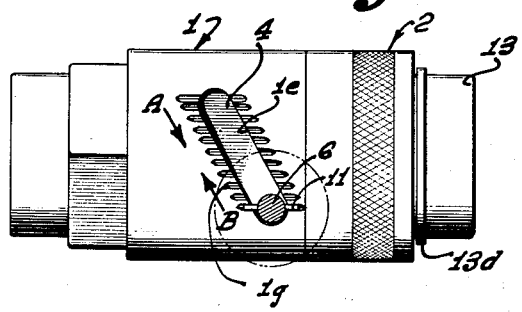
THEODORE A. STEHLIN,
INVENTOR.
BY
ATTORNEY.

THEODORE A. STEHLIN,
INVENTOR.

BY *William B. Hall*
ATTORNEY.

Patented Feb. 23, 1954

2,670,173

UNITED STATES PATENT OFFICE 2,670,173

QUICK-ACTING SHUTOFF VALVE HAVING RENEWABLE VALVE SEAT

Theodore A. Stehlin, Upland, Calif., assignor to St-West, Inc., Carson City, Nev., a corporation of Nevada Application July 6, 1948, Serial No. 37,172

6 Claims. (Cl. 251—131)

My invention relates to a valve mechanism, particularly to one which may be designated as a quick-acting shutoff valve.

One of the principal objects of this invention is to provide a valve mechanism of this class having a quickly reciprocating valve member adapted for easy manual operation in low or high pressure lines, and one which may be effectively sealed without materially lessening the ease of reciprocating the valve member for opening or closing of the valve.

Another important object of this invention is to provide a novelly and efficiently constructed valve housing and a movable valve member therein, in which the valve member is urged to a closed position by the line pressure, and when opened against the pressure the fluid in the line will pass with no material resistance and with relatively uniform and direct or longitudinal flow past the valve member through the housing.

An important object also of this invention is to provide a valve mechanism of this class in which the valve seat may be easily renewed or replaced while the valve is connected in the line and under fluid pressure.

With these and other objects in view, as will appear hereinafter, I have devised a valve having certain novel features of construction, combination, and arrangement of parts and portions, as will be hereinafter described in detail, and particularly set forth in the appended claims, reference being had to the accompanying drawings and to the characters of reference thereon, which form a part of this application in which:

Fig. 1 is a longitudinal partial sectional and partial elevational view of a fluid valve incorporating my invention in a preferred form;

Fig. 2 is a transverse sectional view thereof, taken through 2—2 of Fig. 1;

Fig. 3 is a fragmentary sectional view, taken at 3—3 of Fig. 1;

Figure 4:
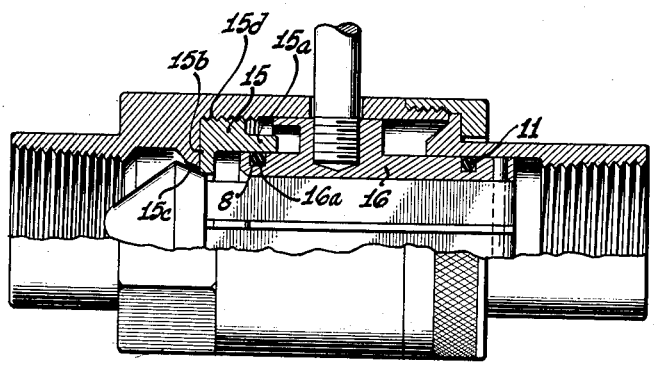
Fig. 4 is a fragmentary view, similar to that of Fig. 1, showing the renewable valve seat in a slightly modified form.

The housing of my valve, shown in Fig. 1 and in some of the other views of the drawings, is substantially cylindrical and has pipe connections at its ends for inserting or connecting the same in a pipe line.

The housing, as shown, consists of housing members 1 and 2 which are screwably connected at their ends, the outlet of the valve housing being screwed into the housing member having the inlet, as indicated by $2^a$ and $1^a$, respectively.

The housing member 1 has an annular flange portion $1^b$ at the interior and between the ends of the member 1, and the radially inner portion of this flange has a valve seat $1^c$ which is coaxial with the housing, the seat diverging toward the inlet end of the housing member 1. Within the housing is a valve member 3 which is movable coaxial within the housing. This valve member has a valve portion $3^a$ which is adapted to engage the seat $1^c$. At the forward end of the valve member is a conically-shaped portion $3^b$ for diverting fluid entering the inlet end of the valve toward the periphery of the valve portion. The valve member has a backwardly extending stem which is coaxial with the valve member, and the stem has longitudinally extending fins or vanes $3^c$ and $3^d$ which radiate from the axis of the valve member, as shown best in Fig. 2, the fins or vanes extending from the rear end of the valve portion to the rear end of the valve member.

The valve housing member 1 has an enlarged recess $1^d$ immediately forwardly of the flange $1^b$, which recess is annular and provides a free passage around the periphery of the valve portion when the valve member is unseated or is shifted forwardly, the conical forward portion $3^b$ of the valve member directing the fluid through the enlarged annular portion $1^d$ past the valve portion $3^a$. The fins $3^c$ and $3^d$ direct the fluid backwardly toward the outlet end of the valve housing with little turbulence.

Within the housing is slidably mounted a cylindrical sleeve 4, the rear end of which is secured to the rear end of the valve member by means of a pin or screw 5 which extends diametrically across the rear end of the sleeve. The pin or screw 5 extends diametrically across the valve member and preferably through the fins $3^d$, as shown in Fig. 2. The rear end of the sleeve has a diametrically reduced portion forming a shoulder $4^c$ which is engaged by abutments at the rear ends of the fins. Thus, as the sleeve 4, which operates the valve, is shifted forwardly, the valve-operating force is applied directly upon the valve and not on the connecting pin 5.

The operating sleeve 4 is shifted forwardly by means of a stem 6, which is screwed at its inner end to the side of the sleeve 4 and extends radially outwardly through a helical slot 1ᵉ in the side wall of the valve housing member 1, as shown best in Fig. 3. As the stem 6, in this instance, is shifted in a clockwise direction, as indicated by the letter B in Fig. 3, the edge of the slot 1ᵉ causes the valve member to be shifted forwardly and unseated. The stem 6 is provided at its outer end with a knob 6ᵃ to facilitate the shifting of the stem.

The valve has a renewable valve seat which is provided at the forward end of a valve-seat sleeve or tubular member 7, the seating surface thereon being designated 7ᵃ. This sleeve has at its forward end an outwardly extending flange 7ᵇ, the peripheral portion of which is threaded and screwed into a threaded recess 1ᶠ within the housing member 1 backwardly from the flange 1ᵇ. The diameter of the valve seat 7ᵇ is less than the diameter of the valve seat 1ᶜ, and is normally engaged by the valve portion 3ᵃ of the valve member when the valve is operating normally. The sleeve 7, however, is removable by unscrewing the same from the threaded recess 1ᶠ in order to remove or renew the valve seat 7ᵃ. In such case, the valve seat 1ᶜ serves as an emergency valve seat while the principal valve seat is renewed.

When the valve-seat sleeve 7 is removed, the rear portion of the valve portion 3ᵃ may also be resurfaced at the portion behind the seat 1ᶜ.

The ends of the sleeve 4 are effectively sealed against any leakage past the operating stem by providing sealing rings 8 and 9 at the opposite ends of the sleeve. These sealing rings are in the form of the commonly known resilient O-rings made of rubber, neoprene, or the like. The ring 8 is located within an annular groove 4ᵃ at the inner side of the forward end of the sleeve and locates the ring 8 against the diametrically outer side of the valve-seat sleeve 7. The ring 9 is located within an annular groove 4ᵇ at the outer side of the rear end of the operating sleeve 4, and the ring engages the inner surface of the valve housing member 2. Within the grooves 4ᵃ and 4ᵇ, and between the forward walls of the grooves and the rings 8 and 9, respectively, are located washers 10 made of felt, leather, or the like.

The location of the stem 6 at any intermediate position is determined by a detent or pawl 11, which may extend through a longitudinal slot in the stem 6 and which may slide longitudinally within the slot and with respect to the stem. Within the stem is mounted a compression spring 12 which normally urges the detent or pawl 11 toward the valve housing. The inner edge of the detent may be V-shaped and enter one of a plurality of grooves 1ᵍ in the outer surface of the housing member 1 adjacent the slot 1ᵉ. As shown, such grooves are provided at the opposite sides of the slot 1ᵉ and extend longitudinally with respect to the axis of the housing member. Thus, the position of the operating stem or member may be resiliently fixed.

The forward or inlet end of the housing member 1 may have a threaded portion 1ʰ, or other means, for connecting the valve to a supply pipe.

A similar pipe connection is provided at the rear end of the valve housing, but this connection consists of a separate member 13, the outer end being provided with internal threads 13ᵃ and the inner end being enlarged and slidably fitted into the outer end of the valve housing member 2, this enlarged portion being designated 13ᵇ, the outward extension of the pipe connecting member 13 being limited by a shoulder provided by a contracted portion or collar 2ᵇ. In the enlarged annular portion 13ᵇ of the pipe connection 13 is provided an annular groove 13ᶜ in which is also located an O-ring 14, sealing the inner end of the pipe connection with the inner surface of the housing member 2. The enlarged portion 13ᵇ of the pipe connection is normally drawn outwardly and held against said annular shoulder of the collar 2ᵇ by means of a snap ring 13ᵈ.

In order to unscrew or remove the rear housing member 2, the snap ring 13ᵈ is removed and the housing member 2 unscrewed from the housing member 1. The space C provided between the forward end of the pipe connection 13 and the rear ends of the valve member and operating sleeve permit the pipe (not shown) connected to the pipe connection 13 to be shifted to one side to facilitate the removal of the operating sleeve and the valve-seat sleeve.

Fig. 4 of the drawings shows a slightly modified form of the valve-seat sleeve. In this instance, the peripheral sleeve portion 15ᵃ of the sleeve 15 has a radially inwardly extending flange 15ᵇ, the radially inner portion providing a valve seat 15ᶜ. The member 15 is secured in place by threading the peripheral sleeve portion 15ᵃ, as indicated by 15ᵈ. In this instance also, the forward end portion of an operating sleeve 16 has an annular groove 16ᵃ at the outer side for locating the sealing ring 8, this ring engaging the inner side of the sleeve portion 15ᵃ.

Figure 5:
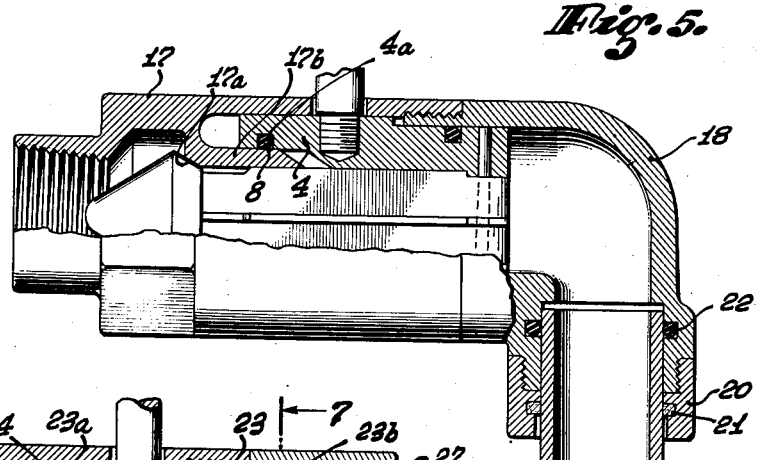
Fig. 5 is a partial sectional and partial elevational view of my valve in a modified form of construction.

In the modified structure shown in Fig. 5, the forward housing member 17 of the valve housing has an annular cone seat 17ᵃ, and a cylindrical wall or apron 17ᵇ extending backwardly from the seat 17ᵃ. In this instance, the valve operating sleeve 4 also has an annular groove 4ᵃ for receiving and locating the sealing ring 8, which also engages the outer surface of the cylindrical wall or apron 17ᵇ.

In this modified form, the rear housing member, designated 18, that is, the housing member which forms the outlet of the valve housing, is also screwably connected to the forward housing member 17. The housing member 18, however, provides a side outlet connection for the valve. The outlet pipe 19 is here shown as slidably inserted into the outlet end of the member 18 and is held therein by an annular coupling member 20. The coupling member holds the pipe 19 in position by engaging an annular shoulder on the pipe. This annular shoulder being provided by a snap ring 21 mounted in an annular groove in the pipe. A sealing ring 22 is also preferably provided within the outlet end of the member 18, which ring embraces the end of the pipe 19.

Figure 6:
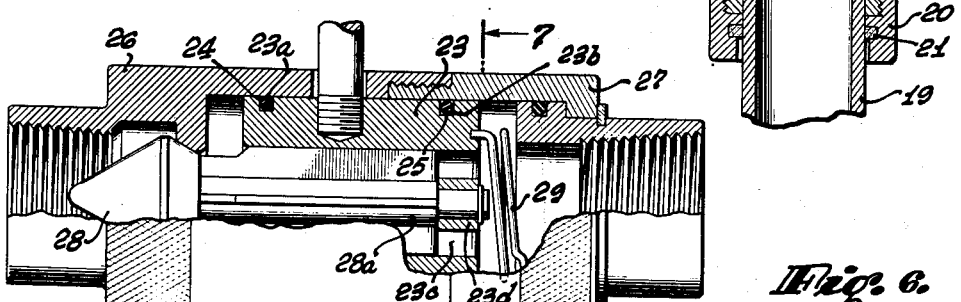
Fig. 6 is a partial longitudinal sectional and elevational view, showing my valve in another slightly modified form of construction; and, Fig. 7 is a transverse sectional view thereof, taken through 7—7 of Fig. 6.
Figure 7:
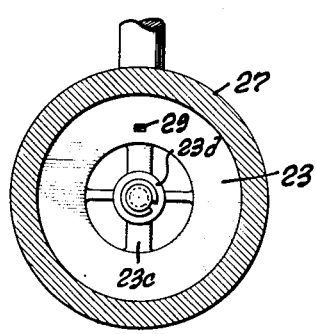

Figs. 6 and 7 show a simple construction of my valve. The operating sleeve 23 is here shown as having external annular grooves 23ᵃ and 23ᵇ at its opposite ends, and sealing rings 24 and 25 located in these grooves and held in engagement with the cylindrical inner walls of the forward and rear housing members 26 and 27. It will be noted that in this instance there is provided no replaceable valve-seat member or sleeve.

In this modified construction, the rear end of the operating sleeve 23 has a spider 23ᶜ and a hub 23ᵈ at the central portion of the spider. A stem 28ᵃ of a valve member 28 is here shown as extending through and fastened to the hub 23ᵈ. Another important difference in this modification is the provision of a torsion spring 29 which is here arranged resiliently to hold the valve 28 in a seated or closed position. The operating member or stem 6, when opening the valve, must rotate the operating sleeve 23 against the torsion of the spring 29. Release of the operating member or stem allows the torsion spring 29 automatically to rotate the valve and sleeve for drawing the valve portion of the valve member 28 in a seated or closed position.

I wish it to be understood that I do not desire to be limited to the exact details of construction shown and described, for obvious modifications will occur to a person skilled in the art.

I claim:

1. In a valve of the class described, a cylindrical housing having an inlet and an outlet and having therein a bevelled annular valve seat diverging towards the inlet end, said housing having an internally threaded portion downstream of said valve seat, a valve seat member comprising a tubular portion and a radial flange at one end screwable into said threaded portion, the member having a second bevelled valve seat positioned downstream of and of slightly smaller diameter than the first valve seat, a valve member having a conical valve portion located upstream of said valve seat member and adapted normally to engage the valve seat of the valve seat member and adapted to engage the first valve seat when the valve seat member is removed by unscrewing, said valve member having a stem extending coaxial with the valve portion and extending therefrom in a downstream direction, an operating sleeve coaxial with and reciprocally mounted within the housing and surrounding the valve member stem and operatively connected to said stem, means extending through the housing for operating the sleeve and the valve member longitudinally within the housing, a first sealing means on the exterior of the sleeve and engaging the interior of the housing for sealing the sleeve with respect to the housing and a second sealing means on the interior of the sleeve and engaging the periphery of the tubular portion of the valve seat member for sealing between the sleeve and the seat member.

2. In a valve of the class described, a cylindrical housing having a flow passage provided with an inlet end and having therein a bevelled annular valve seat diverging towards the inlet end, said housing having an internally screw-threaded portion, a valve seat member comprising a tubular portion and a radial flange at one end screwable into said threaded portion downstream of the valve seat, the member having a second bevelled valve seat positioned downstream of and of slightly smaller diameter than the first valve seat, a valve member having a conical valve portion disposed in said inlet end and adapted normally to engage the valve seat of the valve seat member and adapted to engage the first valve seat when the valve seat member is removed by unscrewing in downstream direction, said valve member having a stem coaxial with the valve portion and extending downstream therefrom, an operating sleeve coaxial with and reciprocally mounted within the housing with an end surrounding said second valve seat, said sleeve being connected at its downstream end with the downstream end of the valve stem, means extending through the housing for operating the sleeve and the valve member longitudinally within the housing, and sealing means on said sleeve engaging the housing and the valve seat member for sealing the sleeve with respect to the housing and for sealing the sleeve with respect to the valve seat member.

3. In a valve of the class described, a cylindrical housing having a flow passage provided with an inlet end and an outlet end and having therein a bevelled annular valve seat diverging towards the inlet end, said housing having an internally screw-threaded portion, a valve seat member comprising a tubular portion and a radial flange at one end screwable into said threaded portion of the housing downstream of the valve seat, the valve seat member having a second bevelled valve seat positioned downstream of and of slightly smaller diameter than the first valve seat, a valve member having a conical valve portion disposed in said inlet end and adapted normally to engage the valve seat of the valve seat member and adapted to engage the first valve seat when the valve seat member is removed by unscrewing in downstream direction, said valve member having a stem coaxial with the valve portion and extending downstream therefrom, an operating sleeve coaxial with and reciprocally mounted within the housing with an end thereof surrounding the stem of said valve member, said sleeve being operatively connected at its opposite end with the downstream end of the stem, means extending through the housing for operating the sleeve and the valve member longitudinally within the housing, and sealing means carried by the sleeve and engaging the interior of the housing and the exterior of the valve seat member, said sealing means being located at the opposite sides of the valve-operating means with respect to the longitudinal axis of the housing.

4. In a valve of the class described, a cylindrical housing having a flow passage provided with an inlet end and an outlet end and having therein a bevelled annular valve seat diverging towards the inlet end, said housing having an internally screw-threaded portion, a valve seat member comprising a tubular portion and a radial flange at one end screwable into said threaded portion of the housing downstream of the valve seat, the valve seat member having a second bevelled valve seat positioned downstream of and of slightly smaller diameter than the first valve seat, a valve member having a conical valve portion disposed in said inlet end and adapted normally to engage the valve seat of the valve seat member and adapted to engage the first valve seat when the valve seat member is removed by unscrewing in downstream direction, said valve member having a stem coaxial with the valve portion and extending downstream therefrom, an operating sleeve coaxial with and reciprocally mounted within the housing and surrounding said stem of the valve member and operatively connected with the stem, means extending through the housing for operating the sleeve and the valve member longitudinally within the housing, and sealing means on the sleeve engaging the interior of the housing and the exterior of the valve seat member, said sealing means being located at the opposite sides of the valve-operating means with respect to the longitudinal axis of the housing, said sealing means comprising resilient O-rings.

5. In a valve of the class described, a cylindrical housing having a flow passage provided with an inlet end and an outlet end and having therein a bevelled annular valve seat diverging towards the inlet end, said housing having an internal screw-threaded portion, a valve seat member comprising a tubular portion and a peripheral flange at one end thereof screwable into said threaded portion of the housing downstream of the valve seat, the member having a second bevelled valve seat positioned downstream of and of slightly smaller diameter than the first valve seat, a valve member having a conical valve portion adapted normally to engage the valve seat of the valve seat member and adapted to engage the first valve seat when the valve seat member is removed by unscrewing in downstream direction, said valve member having a stem coaxial with the valve portion, an operating sleeve coaxial with and reciprocally mounted within the housing and surrounding said stem of the valve member and operatively connected with the stem, and means extending through the housing for operating the sleeve and the valve member longitudinally within the housing.

6. In a valve of the class described, a cylindrical housing having a flow passage provided with an inlet end and an outlet end and having therein a bevelled annular valve seat diverging towards the inlet end, said housing having an internal screw-threaded portion, a valve seat member comprising a tubular portion and a peripheral flange at one end thereof screwable into said threaded portion of the housing downstream of the valve seat, the valve seat member having a second bevelled valve seat positioned downstream of and of slightly smaller diameter than the first valve seat, a valve member having a conical valve portion adapted normally to engage the valve seat of the valve seat member and adapted to engage the first valve seat when the valve seat member is removed by unscrewing in downstream direction, said valve member having a stem coaxial with the valve portion, an operating sleeve coaxial with and reciprocally mounted within the housing and surrounding said stem of the valve member and operatively connected with the stem, means extending through the housing for operating the sleeve and the valve member longitudinally within the housing, and sealing means on said sleeve engaging the housing and the valve seat member, said housing comprising coaxial cylindrical housing members screwable together and axially separable at the downstream side of the operating means.

THEODORE A. STEHLIN.

References Cited in the file of this patent

UNITED STATES PATENTS

| Number | Name | Date |
|---|---|---|
| 674,971 | Kinman | May 28, 1901 |
| 715,622 | Stretch | Dec. 9, 1902 |
| 721,665 | Busha | Mar. 3, 1903 |
| 807,309 | Ott | Dec. 12, 1905 |
| 1,020,022 | Burke | Mar. 12, 1912 |
| 1,150,641 | Smith | Aug. 17, 1915 |
| 1,171,369 | Topping | Feb. 8, 1916 |
| 1,503,132 | Prator | July 29, 1924 |
| 1,585,163 | Milner | May 18, 1926 |
| 1,759,060 | Moore | May 20, 1930 |
| 1,766,703 | Bridgham | June 24, 1930 |
| 1,862,111 | Conran | June 7, 1932 |
| 2,524,142 | Seelof | Oct. 3, 1950 |

FOREIGN PATENTS

| Number | Country | Date |
|---|---|---|
| 2,973 | Great Britain | of 1890 |
| 60,365 | Germany | of 1903 |
| 470,130 | France | of 1901 |
| 503,054 | France | of 1920 |